E. L. WRIGHT.
BAND SAW GUIDE.
APPLICATION FILED MAY 3, 1919.
1,322,743.
Patented Nov. 25, 1919.
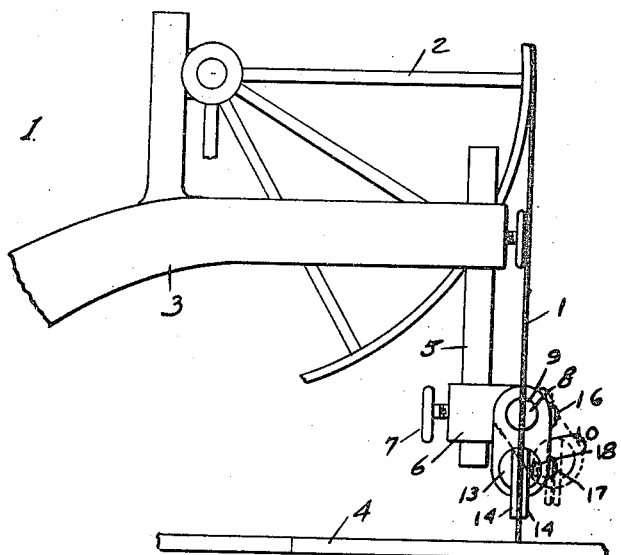
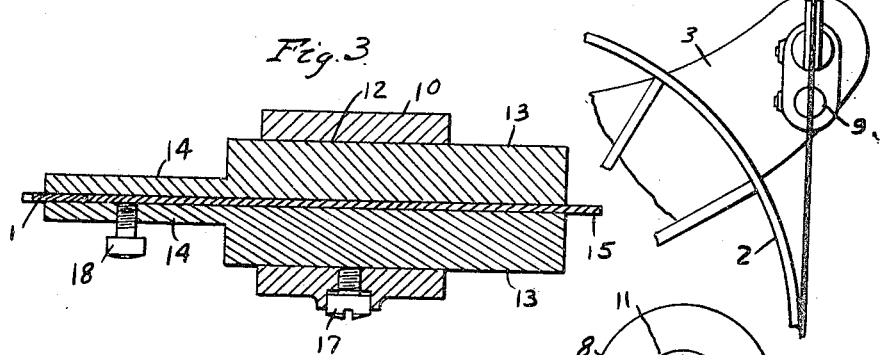
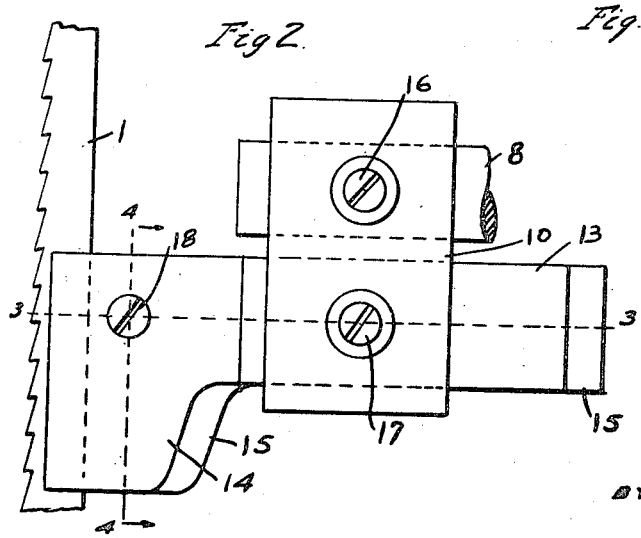
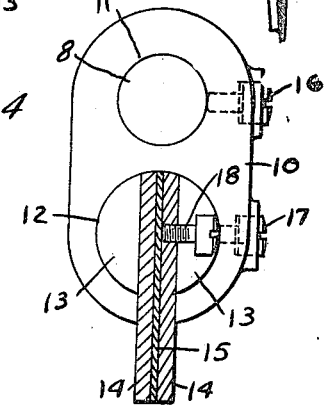
INVENTOR
Edgar L. Wright
ATTORNEY

UNITED STATES PATENT OFFICE.

EDGAR L. WRIGHT, OF PONTIAC, MICHIGAN.

BAND-SAW GUIDE.

1,322,743.    Specification of Letters Patent.    Patented Nov. 25, 1919.

Application filed May 3, 1919. Serial No. 294,448.

*To all whom it may concern:*

Be it known that I, EDGAR L. WRIGHT, a citizen of the United States, residing at Pontiac, in the county of Oakland and State of Michigan, have invented a new and useful Band-Saw Guide, of which the following is a specification.

This invention relates to band-saw guides such as are employed in band-saw machines to hold the saw band to a substantially fixed path of travel as it engages the work.

Among the objects of the invention are: to provide a band-saw guide that will be readily adjustable to compensate for any lateral variation in the path of travel of the saw band; to provide a bearing member for resisting the reaction of the saw resulting from its engagement with the work, which member will be readily adjustable to compensate for wear; to provide guide members spaced to engage the saw-band therebetween and adjustable to vary the spaced relation so as to accommodate saw bands of various thicknesses; to provide a band-saw guide which will have its guide members extended toward the work so as to minimize the length of saw subjected to the stresses resulting from the work; and finally to provide a simple and durable construction of band-saw guide and one that may be inexpensively manufactured.

These objects are accomplished by the construction hereinafter disclosed and illustrated in a preferred embodiment in the accompanying drawing, wherein, Figure 1 is a view in side elevation of a portion of a band-saw machine equipped with guides such as are herein described.

Fig. 2 is a view at right angles to Fig. 1, showing in detail one of the guides in engagement with the saw.

Fig. 3 is a horizontal sectional view of the guide, the section being taken on line 3—3 of Fig. 2.

Fig. 4 is a vertical sectional view, the section being taken on line 4—4 of Fig. 2.

In these views the reference character 1 designates a band-saw, 2 a pair of band wheels upon which the saw is mounted, 3 indicates the frame of the band-saw machine, and 4 the work table thereof, through which the saw usually passes. A stem 5 depends from the frame 3 above the table 4 and carries a collar 6, vertically adjustable by means of a set-screw 7, from which collar a stem 8 projects toward the band-saw to support a guide therefor. Similarly a stem 9 beneath the table 4 projects toward the band-saw to support a guide. The guides which are mounted upon the stems 8 and 9 being duplicates, a description of one thereof will suffice for both. 10 is a holder for the guide members, said holder being formed with two parallel bores 11 and 12, one of which is engaged by the supporting stem 8 or 9, while the other receives a stem jointly formed by a pair of semi-cylindrical members 13 respectively carrying guide members 14. Between said guide members and the parts of said stem there is clamped a third guide member 15 having the nature of a thin plate of fiber or other anti-friction material, whereby the members 14 are sufficiently spaced apart to accommodate the band saw 1 therebetween at their forward ends. A set screw 16 is mounted in the holder 10 to engage the stem 8 or 9 and maintain the holder fixed in any desired position of rotation about the axis of said stem. A set screw 17 is also provided in the holder to engage the composite stem 13 and maintain the parts of said stem in clamping engagement with the member 15 and to also hold said stem fixed in any desired position of rotative adjustment. In the forward portion of one of the guide members 14 there is mounted an adjusting screw 18 which bears against the anti-friction guide member 15 and adapts the members 14 to be sprung apart a distance somewhat greater than the width of the member 15 so that suitable clearance may be provided between said members 14 for saws of varying thickness. The three guide members 14 and 15 are extended in their forward portions toward the work table 4 for the purpose of increasing to some extent the area of the saw-engaging faces and of extending the points of engagement of the saw with the guide close adjacent to the work. Thus the unsupported length of saw which extends between the guides and engages the work is reduced to a minimum.

Discussing now the operation and advantages of the above described construction, it is to be observed that the same is extremely simple as compared with other devices for a like purpose and consequently may be manufactured at comparatively low cost. The two guide members 14 restrain the saw from lateral play and the forward edge of the anti-friction member 15 provides a bearing face engageable with the rear edge of the saw to resist the rearward thrust exerted upon the saw through its engagement with the work.

By loosening the set screw 17 and relieving the member 15 from the clamping stress exerted by the members 14, said member 15 may be adjusted forwardly from time to time to compensate for the wear of its saw engaging face. The invention provides in a very simple manner for adjusting the guide to compensate for any lateral variations in the position of the saw. Thus by loosening the set-screws 16 and 17 the holder 10 may be swung about the stem 8 or 9 through any desired angle, as for example, to the position indicated in dash lines in Fig. 1, and the stem 13 may then be rotated in said holder sufficiently to establish the saw-engaging portions of the guide members in their proper vertical positions, as also indicated in Fig. 1.

The above described guide, while comparatively inexpensive, will nevertheless hold the band-saw accurately to a constant path of travel and will accomplish this result without giving rise to undue friction.

What I claim is:

1. A band-saw guide comprising a saw-engaging member having a stem portion, a holder for said member engaging the stem thereof, means for holding said stem in various positions of rotative adjustment in said holder, and a support for said holder upon which support the holder is angularly adjustable about an axis parallel to that of said stem.

2. A band-saw guide comprising a saw-engaging member having a stem portion, a holder for said member having parallel bores one of which receives said stem portion, a support for said holder engaging the other bore thereof, and means for holding the saw-engaging member in various positions of rotative adjustment in the holder and the holder in various positions of rotative adjustment upon its support.

3. A band-saw guide comprising a pair of guide members spaced to admit a band-saw therebetween, and having complementary semi-cylindrical stem portions, a third guide member intermediate said pair forming a bearing for engaging the rear edge of the band-saw, a holder embracing said stem, a common means for clamping said stem against rotation in said holder and for clamping the intermediate guide member between the two outer ones, and a support for said holder upon which the latter is angularly adjustable about an axis parallel to that of the stem.

4. A band-saw guide comprising a pair of guide members having complementary semi-cylindrical portions forming a stem, a third guide member intermediate said pair forming a bearing for engaging the rear edge of the band-saw, and a holder in which said stem is angularly adjustable, said holder being angularly adjustable about an axis parallel to that of the stem, the saw-engaging portions of said guide members being extended transversely to said stem to permit approaching the guide closely to the work.

5. A band-saw guide comprising a pair of guide members spaced to admit a band-saw therebetween and having complementary semi-cylindrical stem portions, a third guide member intermediate said pair forming a bearing for engaging the rear edge of the band-saw, a holder embracing said stem, and a common means for clamping said stem against rotation in said holder and for clamping the intermediate guide member between the two outer ones.

In testimony whereof I sign this specification.

EDGAR L. WRIGHT.